UNITED STATES PATENT OFFICE.

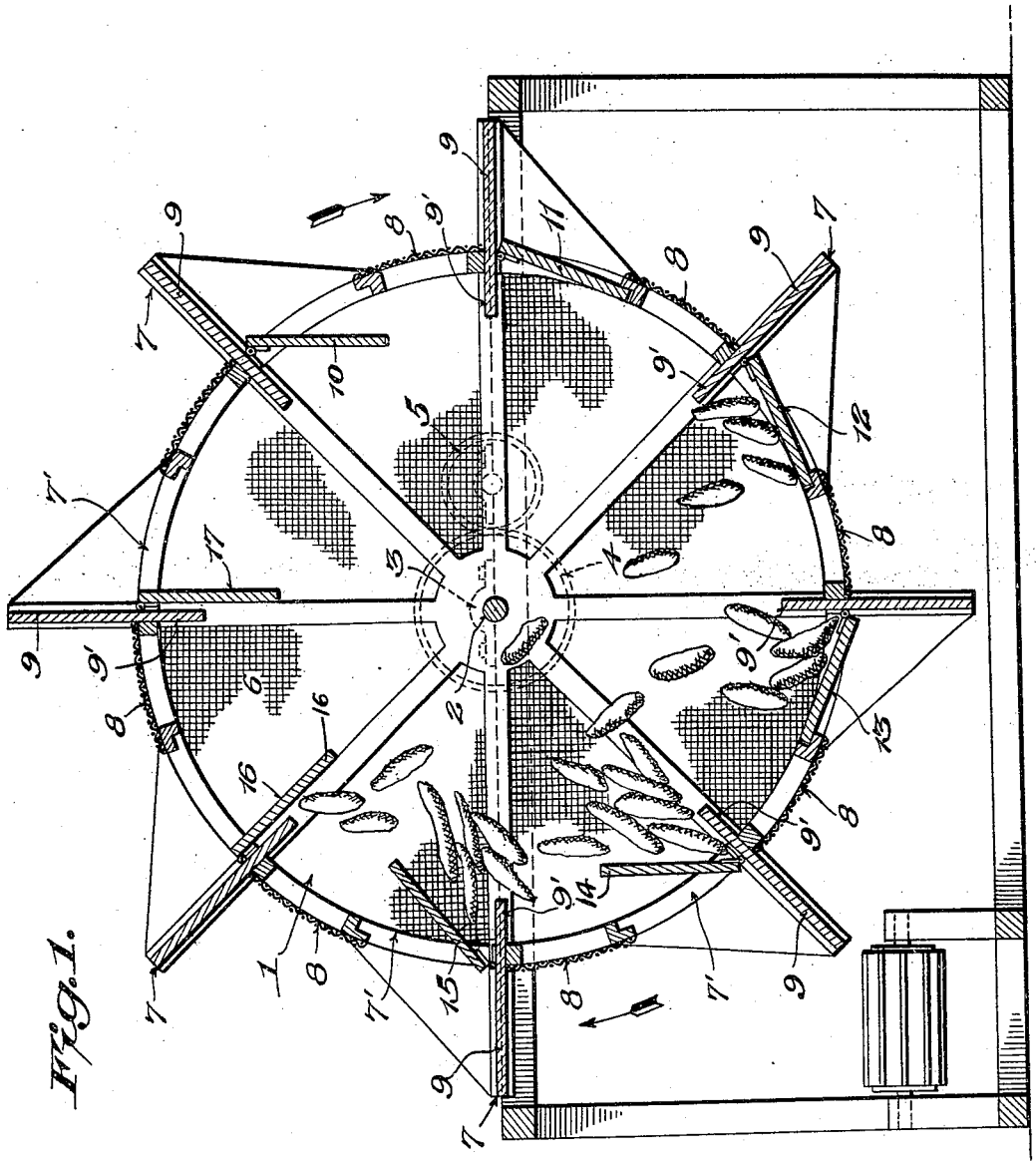

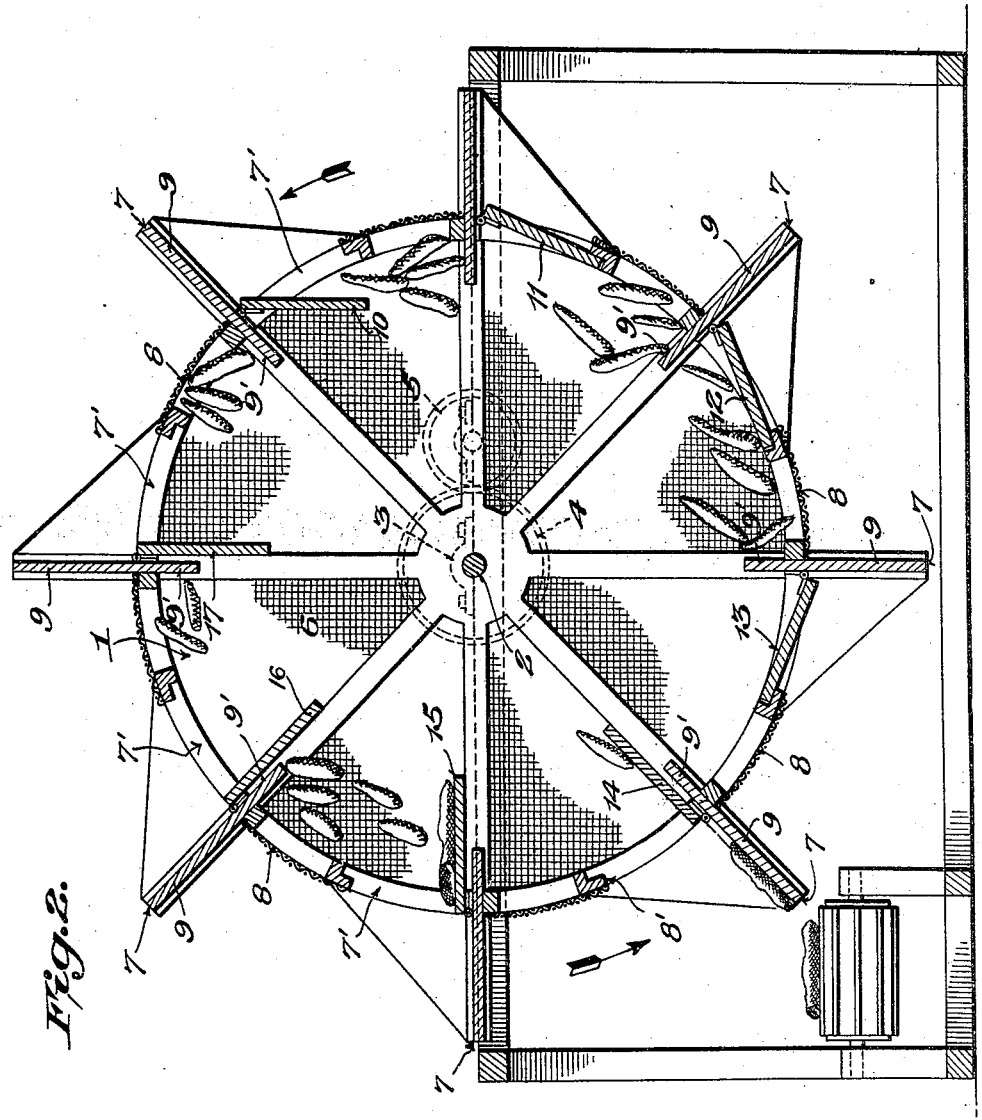

CARMINE TALOTTA, OF CEMENTON, PENNSYLVANIA.

BAG-DUSTING MACHINE.

1,409,499.  Specification of Letters Patent.  Patented Mar. 14, 1922.

Application filed October 14, 1920. Serial No. 417,026.

*To all whom it may concern:*

Be it known that I, CARMINE TALOTTA, a subject of the King of Italy, residing at Cementon, in the county of Lehigh and State of Pennsylvania, have invented certain new and useful Improvements in Bag-Dusting Machines, of which the following is a specification.

The invention relates to improvements in bag dusting machines.

It has heretofore generally been the practice to provide a bag dusting machine consisting of a suitable wheel composed of openwork formation receiving bags, which, upon a rotation of the drum, are dusted therein. When the drum has been rotated a sufficient period of time, a suitable door or like closure is opened and the drum applied to manually remove the dusted bag from the drum. This operation has required the services of many assistants and has utilized much time and labor.

It is an object of the present invention to provide a bag dusting machine wherein the bags may be automatically discharged from the drum after the same have been dusted without resorting to manual labor.

To this end the invention aims to provide a bag dusting machine wherein the bags are dusted and prevented from escaping from the drum during its rotation in one direction, while a rotation of the machine in an opposite direction automatically discharges the cleansed bag.

The invention more specifically comprehends a dusting drum having a plurality of door openings, which are maintained closed upon the rotation of the drum in one direction at given times to prevent the discharge of the bag. The drum, however, when rotated in an opposite direction causes the hinged trap doors to automatically open and permit the bags to be discharged through the door openings at a given point directly upon a receiver or the like.

In the accompanying drawings, I have disclosed a single embodiment of the invention, but it will be understood that the same is susceptible of many changes without departing from the spirit of the appended claims.

In the drawings, Figure 1 represents a view with parts in section showing the direction of rotation of wheel during cleaning operation; and, Figure 2 shows the wheel discharging dusted bags.

Referring now more particularly to the drawings, wherein like reference characters indicate corresponding parts, the numeral 1 designates a suitable drum, mounted upon the shaft 2 supported in bearings 3 for rotation by means of the cooperating gears 4 and 5. The sides of the drum are preferably composed of openwork wire fabric, 6, while the front thereof is likewise constructed of foraminated material in part, which will be later described.

The outline of the drum resembles a paddle wheel, having the forwardly projecting peripheral extensions 7, which terminate in points, spaced apart as clearly shown in Figure 1. The peripheral portion of the drum is provided with screen members 8 extending between the sides thereof, which screen members terminate short of the outwardly extending points 7 to provide openings for a purpose which will later appear. As has been stated, the periphery of the wheel is of a somewhat stepped formation, having eight pointed extensions, the radial walls 9 of the extensions preferably being of a solid construction composed of wood or other suitable material, while as previously pointed out, the peripheral portions spaced from said pointed ends are generally of the openwork material 8.

Disposed within the drum are a plurality of agitating bars 9', the same extending between the sides of said drum and serving to pick up or agitate bags or like articles disposed within the drum during its rotation. Any desired number of agitators may be used, and these agitators are preferably composed of a relatively flat piece of wood or similar material.

It will be observed that by spacing the openwork peripheral side portions 8 from the extensions 9, an opening is provided adjacent each extension, and it is therefore necessary to provide means for preventing the discharge of bags through said opening during the rotation of the wheel. To this end there is pivotally connected to the drum, a series of trap doors 10, 11, 12, 13, 14, 15, 16 and 17, one trap door being pivotally mounted adjacent each extension 9. During the rotation of the dusting machine in the direction of the arrow, Figure 1, it will be observed that the trap doors occupy such positions as to prevent a discharge of the bags contained within the drum through the openings 7'. The doors swing on their pivots, it being observed that the doors 10, 11, 12 and 13 on the right hand side of the drum, are either closed or closing during the rotation of this drum, which prevents the bags from being thrown through openings 7', while the doors 14, 15, 16 and 17 are opened inasmuch as the action of the wheel does not tend to throw the bags through these openings, as the same has a tendency to move the bags inwardly on the left hand side of the drum toward the axis thereof. The bags, after being placed in the drum remain therein during its rotation until a thorough dusting has been effected, and cannot escape as long as the drum is rotated in the direction of the arrow in Figure 1.

It will be appreciated that the bags, by falling upon the doors and being supported by the agitating bars 9' serve to assist in maintaining the doors on the lefthand side of the machine closed during the dusting operation of the drum, and said bags do not discharge through the door openings on the side of the machine, partly because of the centrifugal action of the bags, and the fact that when the doors open the bags are caused to fall to the lower portion of the drum.

It has heretofore been the practice in bag dusting machines to manually remove the bags from the machine after a cleaning thereof. This has required considerable labor, utilizing much time, and it has been recognized by those skilled in the art that it would be a marked advance if efficient automatic means could be provided for discharging the cleansed bag. The present invention aims to provide means for automatically discharging the bags, and to accomplish this, it is only necessary to reverse the direction of rotation of the wheel 1, so that said wheel moves in the direction of the arrow shown in Figure 2. When the wheel is moved in this direction, the agitators 9 elevate the bags, and when the wheel is in a position wherein the door 16 occupies the location shown in Figure 2, the same drops a given bag upon the door 15, and when this door slides around to the position occupied by the door 14, the bag automatically drops through the opening 7' into a suitable receptacle or upon a collecting table. Of course any number of bags may be discharged at the same time through the door opening controlled by the door 14, and it will be appreciated that by arranging the pivoted trap doors in this manner, the reverse rotation of the drum will cause the bags to be automatically discharged from the drum in an exceedingly rapid manner. The bags are of course elevated during the rotation of the drum by the agitators 9', and these bags are discharged in the manner disclosed in Figure 2 by being deposited at proper times upon the open doors for the various discharges 7'. As evidenced in the drawing when the wheel is in a position as shown in Figure 2, certain bags are dropping from beneath the agitator 9' located partly adjacent the door 16, which bags fall upon the open door 15, and these bags then slide from said door when this door reaches the position occupied by the door 14 shown in Figure 2. The agitators continuously raise the bags during the rotation of the drum and serve to drop or discharge said bags upon the appropriate doors as they reach certain positions, and these bags are then discharged in a manner hereinbefore described. In rotating the wheel to effect a dusting of the bags, it is desirable that the speed of the drum be maintained relatively low, say 16 revolutions per minute, but I have discovered that it is preferable when dispelling the bags to rotate the drum at a greater rate of speed, as this serves to more expeditiously discharge the cleansed bag. Any means, such as gearing or the like, may be employed for rotating the drum at a speed greater in one direction than the speed of the drum when moved in the opposite direction, and likewise independent sources of power may be used for moving the drum in its different directions, if this is found desirable.

Having thus described the invention, what I claim is:

1. A bag dusting machine comprising a suitable container, means for rotating the same, said container having a plurality of openings, pivoted trap doors for preventing discharge of the bags in said container when the container is moved in one direction, said trap doors being operable to swing on their pivots to permit bags to be discharged therefrom when said container is rotated in an opposite direction.

2. A bag dusting machine, comprising a rotating container adapted to receive a plurality of bags, discharge openings in said container, movable trap doors for preventing the discharge of bags from said container during its rotation in one direction, said movable trap doors being operable to permit bags to be discharged from the container when the same is rotated in an opposite direction.

3. A bag dusting machine comprising a rotating container, means for feeding bags to the container, a plurality of discharge openings in said container, and means for preventing the discharge of bags from said container during its rotation when moved in one direction, but permitting said bags to be discharged when rotated in an opposite direction, said means comprising doors connected with said container and movable relative to said container.

4. A bag dusting machine, comprising a rotating container having a plurality of door openings arranged in the periphery thereof, swinging doors adapted to normally close certain of said openings when the container is roated in one direction to prevent a discharge of bags therefrom, said swinging doors being operable to open certain of said door openings when the container is rotated in another direction to permit dusted bags to be automatically discharged from the container.

5. A bag dusting machine comprising a container, and means for rotating the same, said container being adapted to receive a supply of bags, and swinging means for maintaining said bags within the container during a rotation thereof in one direction, said means being operable to permit the bags to escape from the container during a rotation in the opposite direction.

In testimony whereof I affix my signature.

CARMINE TALOTTA.